US012654374B1

(12) United States Patent

Filler et al.

(10) Patent No.: US 12,654,374 B1
(45) Date of Patent: Jun. 16, 2026

(54) NEURAL NETWORK STYLIZATION OF WATERMARK SIGNALS

(71) Applicant: Digimarc Corporation, Beaverton, OR (US)

(72) Inventors: Tomas Filler, Beaverton, OR (US); Nicholas Anderson, Colorado Springs, CO (US); Ajith M Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 338 days.

(21) Appl. No.: 18/303,442

(22) Filed: Apr. 19, 2023

Related U.S. Application Data

(63) Continuation-in-part of application No. 17/835,775, filed on Jun. 8, 2022, which is a continuation of application No. 17/681,262, filed on Feb. 25, 2022, now abandoned.

(60) Provisional application No. 63/337,000, filed on Apr. 29, 2022, provisional application No. 63/333,117, filed on Apr. 20, 2022.

(51) Int. Cl.
| | |
|---|---|
| *B29C 45/37* | (2006.01) |
| *B23K 26/362* | (2014.01) |
| *B29L 31/00* | (2006.01) |
| *B65D 1/02* | (2006.01) |

(52) U.S. Cl.
CPC .......... *B29C 45/372* (2013.01); *B23K 26/362* (2013.01); *B65D 1/0207* (2013.01); *B29L 2031/7158* (2013.01); *B65D 2203/00* (2013.01)

(58) Field of Classification Search
CPC .. B29C 45/372; B23K 26/362; B65D 1/0207; B65D 2203/00; B29L 2031/7158
See application file for complete search history.

(56) References Cited

U.S. PATENT DOCUMENTS

| | | |
|---|---|---|
| 5,636,292 A | 6/1997 | Rhoads |
| 5,832,119 A | 11/1998 | Rhoads |
| 5,862,260 A | 1/1999 | Rhoads |
| 6,060,428 A | 5/2000 | Chang |
| 6,345,104 B1 | 2/2002 | Rhoads |
| 6,483,927 B2 | 11/2002 | Brunk |
| 6,567,534 B1 | 5/2003 | Rhoads |
| 6,580,809 B2 | 6/2003 | Stach |
| 6,590,996 B1 | 7/2003 | Reed |
| 6,614,914 B1 | 9/2003 | Rhoads |
| 6,625,297 B1 | 9/2003 | Bradley |
| 6,724,914 B2 | 4/2004 | Brundage |
| 6,760,464 B2 | 7/2004 | Brunk |
| 6,987,861 B2 | 1/2006 | Rhoads |
| 6,993,152 B2 | 1/2006 | Patterson |
| 7,072,490 B2 | 7/2006 | Stach |
| 7,231,061 B2 | 6/2007 | Bradley |
| 7,340,076 B2 | 3/2008 | Stach |
| 7,532,741 B2 | 5/2009 | Stach |
| 7,555,139 B2 | 6/2009 | Rhoads |
| 7,831,062 B2 | 11/2010 | Stach |
| 7,856,143 B2 | 12/2010 | Abe |
| 8,009,893 B2 | 8/2011 | Rhoads |
| 8,144,368 B2 | 3/2012 | Rodriguez |
| 8,515,121 B2 | 8/2013 | Stach |
| 9,635,378 B2 | 4/2017 | Holub |
| 9,747,656 B2 | 8/2017 | Stach |
| 10,657,676 B1 | 5/2020 | Rehfeld |
| 10,664,722 B1 | 5/2020 | Sharma |
| 10,748,232 B2 | 8/2020 | Kamath |
| 11,062,108 B2 | 7/2021 | Bradley |
| 11,276,133 B2 | 3/2022 | Kamath |
| 2002/0136429 A1 | 9/2002 | Stach |
| 2003/0039376 A1 | 2/2003 | Stach |
| 2003/0053654 A1 | 3/2003 | Patterson |
| 2004/0032972 A1 | 2/2004 | Stach |
| 2005/0207615 A1 | 9/2005 | Stach |
| 2006/0071081 A1 | 4/2006 | Wang |
| 2006/0115110 A1 | 6/2006 | Rodriguez |
| 2007/0071278 A1 | 3/2007 | Cheng |
| 2008/0112590 A1 | 5/2008 | Stach |
| 2008/0264824 A1 | 10/2008 | Alejandra |
| 2009/0018996 A1 | 1/2009 | Hunt |

(Continued)

FOREIGN PATENT DOCUMENTS

| | | |
|---|---|---|
| WO | 2006048368 | 5/2006 |
| WO | 2011029845 A2 | 3/2011 |

(Continued)

OTHER PUBLICATIONS

Crowson, Web Archive of github<dot>com/crowsonkb/style-transfer-pytorch, May 13, 2021. 7 pages.

Deng et al, Arbitrary Video Style Transfer via Multi-Channel Correlation, Proceedings of the AAAI Conference on Artificial Intelligence, vol. 35, No. 2, pp. 1210-1217, 2021.

Gatys et al., "Image Style Transfer Using Convolutional Neural Networks", Proc. of IEEE Conference on Computer Vision and Pattern Recognition (CVPR), pp. 2414-2423, 2016.

Kingma, et al, Adam: a method for stochastic optimization, arXiv preprint arXiv:1412.6980, 2017.

Li, et al, Demystifying neural style transfer, arXiv preprint arXiv:1701.01036, 2017. 7 pages.

(Continued)

*Primary Examiner* — Nathan L Van Sell
(74) *Attorney, Agent, or Firm* — Klarquist Sparkman, LLP

(57) ABSTRACT

A watermark image is stylized using a neural network. Stylization can employ a composite loss function in which a content loss term is based on image similarity to the watermark image itself, rather than based on similarity to layer activations produced by the neural network. The composite loss function may further avoid use of mean-squared error in connection with content loss, to allow the network freedom to produce a stylized image having a mean luma value that is remote from a mean luma value of the watermark image. An exemplary application generates texture patterns that simulate leather, yet convey plural-symbol payloads. Many other features and arrangements are also detailed.

12 Claims, 4 Drawing Sheets

(56) References Cited

U.S. PATENT DOCUMENTS

| | | | |
|---|---|---|---|
| 2009/0129592 A1 | 5/2009 | Swiegers |
| 2009/0220121 A1 | 9/2009 | Stach |
| 2010/0119108 A1 | 5/2010 | Rhoads |
| 2010/0165158 A1 | 7/2010 | Rhoads |
| 2010/0303349 A1 | 12/2010 | Bechtel |
| 2010/0325117 A1 | 12/2010 | Sharma |
| 2011/0110555 A1 | 5/2011 | Stach |
| 2011/0212717 A1 | 9/2011 | Rhoads |
| 2011/0214044 A1 | 9/2011 | Davis |
| 2011/0276663 A1 | 11/2011 | Rhoads |
| 2012/0133954 A1 | 5/2012 | Takabayashi |
| 2012/0229467 A1 | 9/2012 | Czerwinski |
| 2013/0001313 A1 | 1/2013 | Denniston, Jr. |
| 2014/0029809 A1 | 1/2014 | Rhoads |
| 2014/0052555 A1 | 2/2014 | Macintosh |
| 2014/0210780 A1 | 7/2014 | Lee |
| 2014/0366052 A1 | 12/2014 | Ives |
| 2015/0055837 A1 | 2/2015 | Rhoads |
| 2015/0262347 A1 | 9/2015 | Duerksen |
| 2015/0269617 A1 | 9/2015 | Mikurak |
| 2016/0026853 A1 | 1/2016 | Wexler |
| 2016/0189381 A1 | 6/2016 | Rhoads |
| 2016/0275326 A1 | 9/2016 | Falkenstern |
| 2017/0004597 A1 | 1/2017 | Boles |
| 2017/0024840 A1 | 1/2017 | Holub |
| 2017/0024845 A1 | 1/2017 | Filler |
| 2017/0193628 A1 | 7/2017 | Sharma |
| 2018/0005343 A1 | 1/2018 | Rhoads |
| 2018/0068463 A1 | 3/2018 | Risser |
| 2018/0082407 A1 | 3/2018 | Rymkowski |
| 2018/0082715 A1 | 3/2018 | Rymkowski |
| 2018/0150947 A1 | 5/2018 | Lu |
| 2018/0158224 A1 | 6/2018 | Bethge |
| 2018/0182116 A1 | 6/2018 | Rhoads |
| 2018/0211157 A1 | 7/2018 | Liu |
| 2018/0285679 A1 | 10/2018 | Amitay |
| 2018/0357800 A1 | 12/2018 | Oxholm |
| 2018/0373999 A1 | 12/2018 | Xu |
| 2019/0139176 A1 | 5/2019 | Stach |
| 2019/0213705 A1 | 7/2019 | Kamath |
| 2019/0266749 A1 | 8/2019 | Rhoads |
| 2019/0289330 A1 | 9/2019 | Alakuijala |
| 2019/0332840 A1 | 10/2019 | Sharma |
| 2020/0082249 A1 | 3/2020 | Hua |
| 2022/0388213 A1 | 12/2022 | Filler |

FOREIGN PATENT DOCUMENTS

| | | | |
|---|---|---|---|
| WO | 2016153911 A1 | 9/2016 |
| WO | 2018111786 | 6/2018 |
| WO | 2019113471 | 6/2019 |
| WO | 2019165364 | 8/2019 |

OTHER PUBLICATIONS

Liu et al, CS 229 Project Final Report: Neural Style Transfer, Stanford University, 2019. 5 pages.
Risser, et al, Stable and controllable neural texture synthesis and style transfer using histogram losses, arXiv preprint arXiv:1701.08893, 2017. 14 pages.
Sanakoyeu, et al, A style-aware content loss for real-time hd style transfer, Proceedings of the European conference on computer vision (ECCV), pp. 698-714, 2018.
Tuyen, et al, Deep correlation multimodal neural style transfer, IEEE Access, 9, 141329-141338, 2021.
Yeh, et al, Improved style transfer by respecting inter-layer correlations, arXiv preprint arXiv:1801.01933, 2018. 11 pages.
12 Creative Barcode Designs that (Amazingly) Work, Kongkiat blog from Web Archive, copy dated Apr. 23, 2015.
40 Gorgeous QR Code Artworks That Rock, Kongkiat blog from Web Archive, copy dated Apr. 9, 2015.

A. Secord, "Weighted Voronoi Stippling," Proc. 2nd Ann. Symp. Non-Photorealistic Animation and Rendering (NPAR 2002), ACM Press, 2002, pp. 27-43.
Chu, et al, Halftone QR codes, ACM Transactions on Graphics, vol. 32, No. 6, Nov. 1, 2013, p. 217. (8 pages).
Davis B, Signal rich art: enabling the vision of ubiquitous computing. In Media Watermarking, Security, and Forensics III Feb. 8, 2011 (vol. 7880, p. 788002). International Society for Optics and Photonics. (11 pages).
Davis, Bruce ED—Memon Nasir D. et al: "Signal rich art: enabling the vision of ubiquitous computing", Media Watermarking, Security, and Forensics III, SPIE, 1000 20th St. Bellingham WA 98225-6705 USA, vol. 7880, No. 1, Feb. 10, 2011, pp. 1-10, XP060007207, DOI: 10/1117/12.881742 (retrieved on Feb. 8, 2011).
Excerpts from file of corresponding EPO application 18836559.7 including related PCT documents concerning application PCT/US18/64516 (published as WO2019113471).
Extended European Search Report for App. No. EP19815064.1, dated Feb. 28, 2022, 13 pages.
Gatys, et al, A Neural Algorithm of Artistic Style. arXiv preprint arXiv:1508.06576, Aug. 26, 2015. 16 pages.
Google Scholar Search Results.
Grinchuk, et al, Learnable visual markers, Advances in Neural Information Processing Systems 29 (2016).
Hayes et al., "Generating Steganographic Images via Adversarial Training", Proceedings of the 31st annual conference on advances in Neural Information Processing Systems, Mar. 2017, pp. 1951-1960, XP055573249.
International Preliminary Report on Patentability for PCT/US2019/036126, dated May 22, 2020. (8 pages).
International Search Report and Written Opinion for Application No. PCT/US19/36126, date of mailing Oct. 9, 2019, 12 pages.
Invitation to Pay Additional Fees including Communication Relating to the Results of the Partial International Search in PCT/US2018/064516, mailed Apr. 5, 2019. 17 pages.
Johnson, et al, "Perceptual losses for real-time style transfer and super-resolution", European Conference on Computer Vision, Oct. 8, 2016, pp. 694-711.
Johnson, excerpts from github web site "Fast-neural-style," Nov. 19, 2017. 19 pages.
Kaplan, Craig S. et al: "TSP Art", Bridges 2005: Renaissance Banff: Mathematics, Music, Art, Culture, Jul. 31, 2005 (Jul. 31, 2005), pp. 301-308, XP055893366, ISBN: 978-0-9665201-6-3 Retrieved from the Internet: URL:https://archive.bridgesmathart.org/2005/bridges2005-301.pdf.
Ke et al., "Kernel Target Alignment for Feature Kernel Selection in Universal Steganographic Detection based on Multiple Kernel SVM", International Symposium on Instrumentation & Measurement, Sensor Network and Automation, Aug. 2012, pp. 222-227.
Lengstrom, excerpts from github web site, "Fast Style Transfer in TensorFlow," Oct. 3, 2017. 24 pages.
Li Hai-Sheng et al., "Style transfer for QR code", Multimedia Tools and Applications, vol. 79, No. 45-46, Dec. 1, 2020, pp. 33839-33852, XP037308023.
Lin, et al., Artistic QR code embellishment. Computer Graphics Forum, Oct. 1, 2013, vol. 32, No. 7, pp. 137-146.
Lin, et al., Efficient QR code beautification with high quality visual content, IEEE Transactions on Multimedia, vol. 17, No. 9, Sep. 2015, pp. 1515-1524.
Liu, et al., Line-based cubism-like image—a new type of art image and its application to lossless data hiding, IEEE Transactions on Information Forensics and Security, vol. 7, No. 5, Oct. 2012, pp. 1448-1458.
Nikulin, Exploring the neural algorithm of artistic style, arXiv preprint arXiv:1602.07188, Feb. 23, 2016. 15 pages.
Photoshop Elements Help—Patterns, Web Archive, Mar. 13, 2014. 2 pages.
Preston, et al, Enabling hand-crafted visual markers at scale, Proceedings of the 2017 ACM Conference on Designing Interactive Systems, Jun. 10, 2017, pp. 1227-1237.
Puyang, et al, Style Transferring Based Data Hiding for Color Images, International Conference on Cloud Computing and Security, Jun. 8, 2018, pp. 440-449.

(56) References Cited

OTHER PUBLICATIONS

Raval, excerpts from github web site, Style Transfer Using VGG-16 Model, Mar. 8, 2017. 15 pages.

Rosebrock, excerpts from web page Neural Style Transfer with OpenCV, Aug. 27, 2018. 23 pages.

Russian and Japanese Barcodes: a New Venue for Artistic Expression, Inventorspot web page from Web Archive, copy dated Mar. 20, 2015.

Simonyan et al, Very Deep Convolutional Networks for Large-Scale Image Recognition, arXiv preprint 1409.1556v6, Apr. 10, 2015. 14 pages.

Ulyanov, et al, Improved texture networks: Maximizing quality and diversity in feed-forward stylization and texture synthesis, Proc. 2017 IEEE Conference on Computer Vision and Pattern Recognition, pp. 6924-6932.

Wong, Fernando J. et al: "Abstracting images into continuous-line artistic styles", Visual Computer, Springer, Berlin, DE, vol. 29, No. 6, Apr. 23, 2013 (Apr. 23, 2013), pp. 729-738, XP035366252, ISSN: 0178-2789, DOI: 10.1007/S00371-013-0809-1 [retrieved on Apr. 23, 2013].

Yang, et al, ARTcode: Preserve art and code in any image, Proc. 2016 ACM International Joint Conference on Pervasive and Ubiquitous Computing, pp. 904-915.

Zhu et al., "Unpaired Image to Image Translation using Cycle-Consistent Adversarial Networks", 2017 IEEE International Conference on Computer Vision, Mar. 2017, pp. 2242-2251.

NEURAL NETWORK STYLIZATION OF WATERMARK SIGNALS

RELATED APPLICATION DATA

This application claims priority from provisional applications 63/333,117, filed Apr. 20, 2022, and 63/337,000, filed Apr. 29, 2022. This application also is a continuation-in-part of application Ser. No. 17/835,775, filed Jun. 8, 2022 (published as US20220388213 on Dec. 8, 2022), which is a continuation of application Ser. No. 17/681,262, filed Feb. 25, 2022 (now abandoned). The disclosures of these previous applications are incorporated herein by reference.

INTRODUCTION

Neural network style transfer techniques create an output image by combining content from a first image (the target content image) with style from a second image (the target style image). Work in the field was spurred by influential papers by Gatys et al (A Neural Algorithm of Artistic Style, arXiv:1508.0657. Sep. 2, 2015, and Image Style Transfer Using Convolutional Neural Networks, Proc. of 2016 IEEE Conference on Computer Vision and Pattern Recognition, pp. 2414-2423). These papers inspired further work that explored topics as diverse as feed-forward architectures, universal feed-forward models, disentanglement of style and content, ultra-resolution models, and meta-learning techniques, but the Gatys approach still remains a benchmark against which other methods are compared.

Gatys captures the artistic style of a target style image by applying it to a multi-layer convolutional neural network that has been pre-trained for image recognition using the ImageNet dataset. (Gatys employs the VGG-16 network of Simonyan.) Correlations are then determined between neural activations (filter responses) of, e.g., five early layers. Gram matrices are particularly used for this purpose and serve to represent the artistic style of the style image. Gatys further initializes the style transfer process by applying the target content image to this pretrained neural network and recording resulting neural activations in one of the network layers. This provides a reference set of content activations towards which a stylized image can be morphed. These neural activations and Gram matrices serve as reference data in the process that ensues.

The Gatys style transfer process uses an iterative optimization method in which pixels of a starting image-often a white noise image—are successively modified so that the image takes on aspects of both the content image and the style image (i.e., adapting content from the former and artistic style from the latter). In particular, each time an image is applied to the network, a new set of neural activations and a new set of Gram matrices are produced. The image is then modified in a manner calculated to drive the resulting neural activations towards the reference activations that resulted from the content image, and to drive the resulting Gram matrices towards the reference Gram matrices that resulted from the style image. In particular, a composite loss function is evaluated at each iteration and includes a style term that expresses a Euclidean distance between the current and reference Gram matrix data, and a content term that expresses a Euclidean distance between the current and reference neural activations, respectively weighted by parameters $\alpha$ and $\beta$. The adapted image is then applied to the input of the network and the process repeats. Such successive adaptation of the image typically continues until the loss function drops to a predetermined threshold, or until a fixed number of iterations has been completed.

Work by Johnson et al built on Gatys by employing a feed-forward network that is previously trained to apply one particular style to any input image. (Perceptual Losses for Real-Time Style Transfer and Super-Resolution, 14th European Conference on Computer Vision, pp. 694-711, 2016.) Iterative optimization is performed only once, during training of the feed-forward network. Thereafter, any input image can be stylized by a single pass through the trained network, which simply applies the learned network weights. Johnson's method has become more popular than that of Gatys for applications in which a particular style image is to be used repeatedly, each time applied to a different input content image.

Applicant's patent publication US20190213705 taught that style transfer techniques such as those noted above, when provided with a content image that includes a digital watermark ("watermark") pattern, can produce a stylized output image from which the watermark can still be read.

Applicant has made several advances in the field of generating watermarked patterns using style transfer networks, which yield results better than were possible with the techniques detailed in the just-cited patent publication. These advances are detailed in the present application.

DETAILED DESCRIPTION

In most style transfer methods, including Gatys and Johnson, fidelity to the target content and style images is expressed by mean-squared terms in content loss and style loss functions, respectively. (Mean-squared metrics are sometimes termed L-squared norms, L2 norms, Frobenius norms, Euclidean distances, or simply squared-error losses.) Applicant has found that a mean-squared metric is sub-optimum for the content loss term when the target content image comprises a digital watermark pattern. This is because a watermark pattern in a stylized output (iterated) image can be plainly readable even if the Gatys mean-squared content loss term is large. Rather, applicant has found what is necessary and important is that the value relationships between adjacent pixels (e.g., the inter-pixel gradients) be mimicked between the content image and the iterated image. It is in these inter-pixel gradients that the watermark is represented, rather than in any absolute pixel values.

A simple example showing a failing of the squared error loss involves a change in luminance between a watermark pattern content image, and an iteratively stylized image-either in local image regions or image-wide. The iterated image can be locally or globally lighter or darker than the watermark pattern content image, with little change in watermark readability. Yet such changes cause large swings in Gatys' mean-squared content error metric. Accordingly, such changes are essentially foreclosed to stylization processes premised on minimizing such a squared error content loss metric (e.g., Gatys, Johnson and the like). Yet allowing freedom for the local and global luminance to vary in the iterated image, compared to the watermark pattern content image, enables a larger possible solution space, enabling results in which the desired style can be more strongly expressed, while preserving watermark readability.

Applicant has found several variant content loss functions that work better than the L2 loss function. (These functions are also found to work better than L1 content loss functions and other content loss functions that are sensitive to regional luminance changes.) These variants are detailed below.

Applicant has also found it preferable to derive the content loss function (sometimes termed a feature reconstruction loss function) not based on feature representations within the neural network as done in Gatys (Gatys employs feature representations from layer conv4_2). Rather, applicant prefers to base the content loss function on a similarity metric computed between the original content (watermark) image and the iteratively-adjusted images themselves.

Applicant also prefers to derive the style loss term based on responses of three layers in the neural network, not five (conv1_1, conv2_1, conv3_1, conv4_1 and conv5_1) as taught by Gatys. However, five or another number can be used in alternative arrangements.

Figure 1:
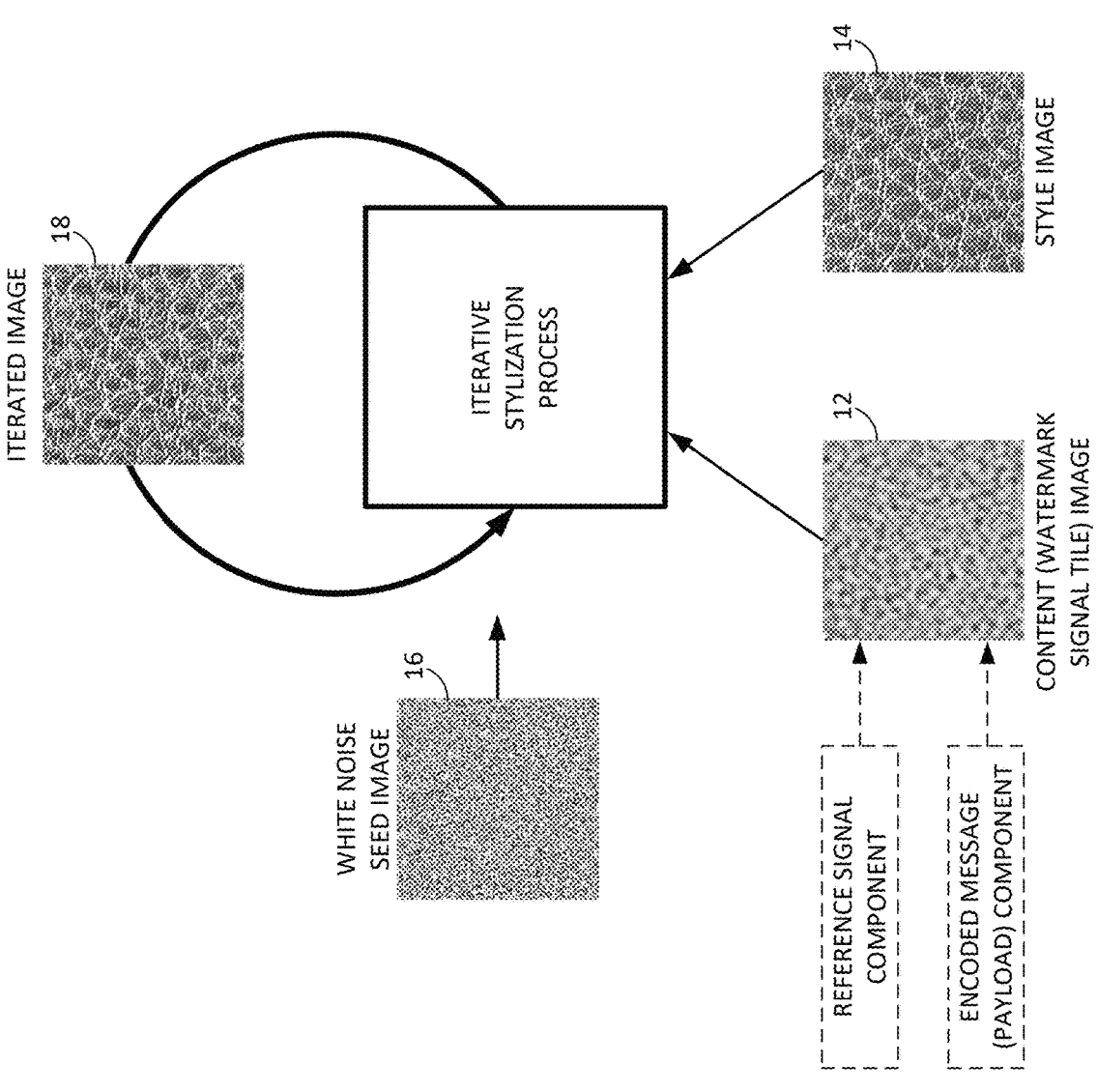
FIG. 1 is a conceptual illustration of one exemplary style transfer process.

FIG. 1 shows a conceptual view of one stylization process. The process takes, as inputs, a target content image 12 in the form of a watermark pattern (signal tile), and a target style image 14 (sometimes termed the "content image" and the "style image" for brevity's sake). In this particular example, the style image is a depiction of a leather pattern (taken from priority application US20220388213). The network iteratively adjusts a seed image 16 (here a noise image) to take on style attributes of the style (leather) image, while also taking on content attributes of the watermark pattern. Hundreds of iteration cycles typically follow, during which the processed image is incrementally adjusted to yield the final form shown at the top of the figure—an output image 18 with attributes of both the style and content images. The relative strength of expression of the style attributes vs. the content attributes is set by the noted parameter weights α and β. (The seed image, and each of the incrementally adjusted images, such as iterated image 18 in FIG. 1, is sometimes termed an iteratively-processed image.)

Figure 2:
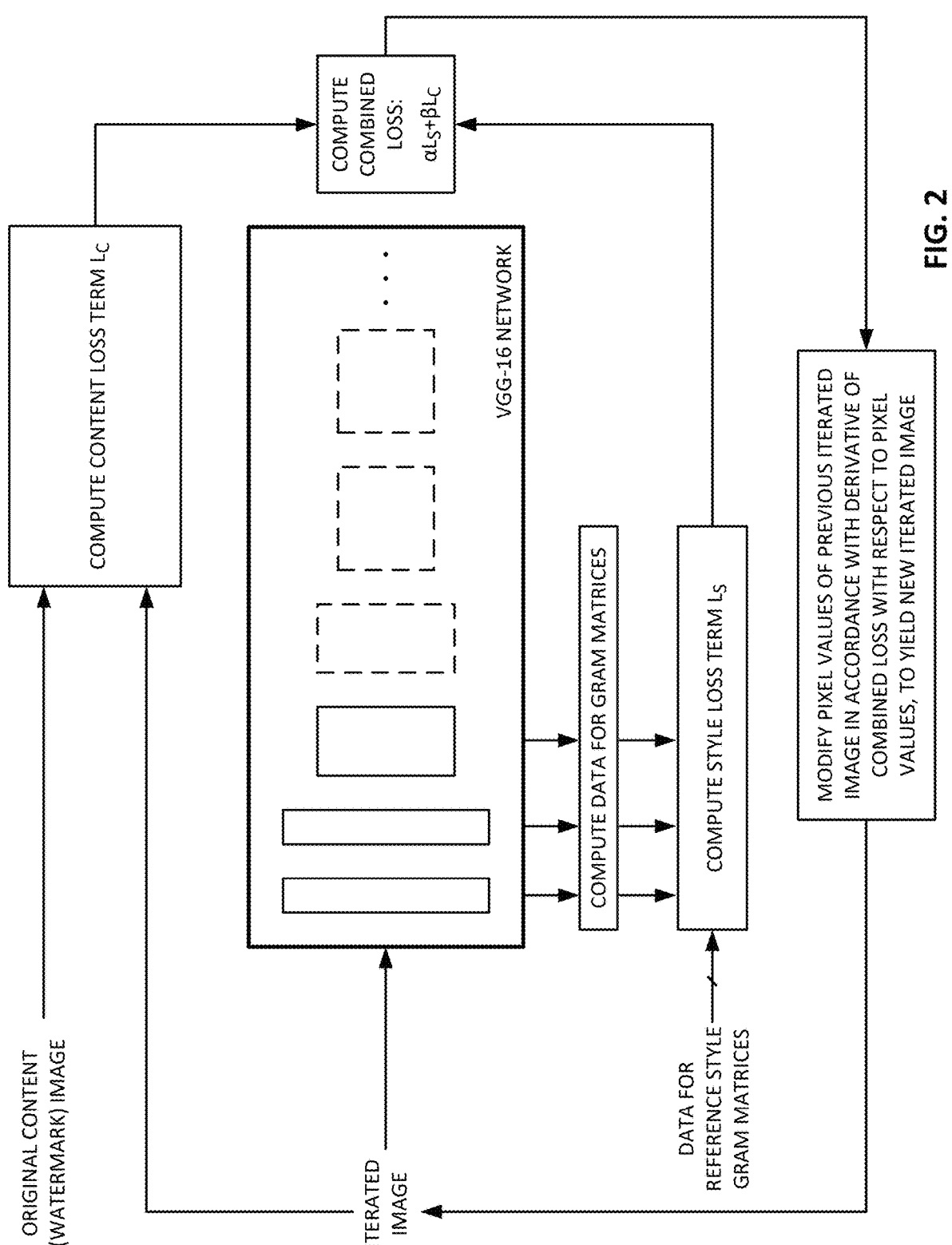
FIG. 2 is a diagram of a style transfer arrangement employing aspects of the present technology.

FIG. 2 dives more deeply. The process is initialized by applying the style image to the VGG network as its input stimulus, determining resultant activations (feature representations) of the first three layers, and deriving Gram matrices based on these activations. This Gram data is stored as reference style data.

Unlike Gatys, an illustrative initialization process does not further include applying the content image to the network as input stimulus to determine its resultant neural layer activations. This is because the content loss function favored by applicant is not based on layer activations of the neural network. Rather, applicant employs other content loss metrics that are based on a similarity comparison between the iterated image and the original content (watermark) image, as further detailed below.

Iteration commences by application of the seed image to the network. Gram matrix data are derived from neural layer activations produced by the network in response to this stimulus, as compared with the stored reference Gram data to produce a style loss component—as in Gatys. A content loss component is then produced by comparing the stimulus image with the content (watermark) image. The combined loss (with style and content losses respectively weighted by parameters α and β) is used with gradient descent to adjust pixel values of the stimulus image. That is, the pixel values of the noise image are adjusted in directions calculated to reduce the combined loss function. The process then repeats with this adjusted image applied to the network as the stimulus image.

Applicant has successfully employed several variant content loss functions. Each expresses similarity between the iterated image and the content (watermark image) themselves, rather than between feature representations produced by the neural network in response to stimulation with such images.

Similarity between two images can be indicated by many different metrics. One is correlation. Correlation, in turn, can be implemented in various fashions. One particular implementation computes a dot product between the original content (watermark) image and the iterated image. The resulting dot product value then serves as the content loss component of the combined loss.

It will be recognized that correlation, such as the just-mentioned dot product, increases with increasing similarity between the two inputs (images). We typically want to increase this correlation value—not decrease it. Gradient descent, however, commonly denotes a process that seeks to minimize a function rather than maximize it. Those skilled in the art, however, will understand that loss function components of this sort (i.e., in which larger is better) can be used in gradient descent methods by various operators. One is the inverse operator. That is, the inverse of correlation gets smaller as the correlation value gets larger. Similarly, the sum of a fixed value and the negative of the correlation value gets less positive as the correlation value gets larger. The use of such operators in defining loss functions is well-known to artisans and is employed as appropriate, e.g., in implementations in which a loss metric component desirably is driven larger rather than smaller. Such detail is not belabored further due its familiarity.

Alternatively, gradient ascent methods can be used, e.g., if both loss components are of the larger-is-better variety. (In such case, the adjective "loss" may be inappropriate, so the two terms can alternatively be referenced simply as style and content functions.) Collectively, gradient ascent and gradient descent methods may be termed gradient-based optimization.

In some embodiments, the original content (watermark) image is transformed into a zero-mean signal prior to computing correlation (e.g., by the dot product operator). For example, if the watermark image is originally an 8-bit greyscale image with pixel values in the range 0-255, these values can be shifted down by the average of all values. In one common case, this average value is 127.5, so this shifting yields real values between −127.5 and 127.5. Alternatively, the watermark signal can be originally-generated to have a zero mean, e.g., with values ranging from −1 to 1.

As is familiar to artisans, many watermark signals comprise two components. A first, payload component expresses a plural-symbol message. A second, reference component (synchronization component) aids a watermark detector in finding the watermark signal in imagery, and determining its affine presentation parameters (e.g., rotation, scale and translation). The two components are generated separately and are combined in a weighted relationship in which the reference component usually dominates. Such details are elaborated in documents incorporated by reference, such as U.S. patent publication 20190332840.

A variant content loss function has two terms, corresponding to these two components of watermark signals. One term expresses similarity between the iterated image and the payload component of the content (watermark) signal, and the other term expresses similarity between the iterated image and the reference (synchronization) component of the content (watermark) signal. Again, various similarity metrics can be computed between these pairings of data, with implementation by a dot product operator being exemplary. The two terms can be combined in a weighted sum to yield a net content loss function. That is, the content loss function can be of the form:

$$L_{content} = J[(\text{iterated}) \cdot (\text{payload})] \cdot K[(\text{iterated}) \cdot (\text{reference})]$$

where iterated, payload and reference are the iterated image, the payload component of the watermark image, and the reference component of the watermark image, respectively. J and K are weighting constants, which are often unequal.

Each of the watermark components can be adjusted to have a zero mean, in the manner detailed earlier.

Content loss functions expressing similarity between images (e.g., the iterated image vs. the content/watermark image, or vs. the two components of the watermark image) can employ distance norms instead of correlation values. These include the total variation norm, the L1 norm (i.e., the sum of differences between values of spatially-corresponding pixels in two images), and the L2 norm (i.e., the sum of squared differences between values of corresponding pixels in two images). To address the changed luminance failing noted above, such norms can be based on zero-mean counterparts of the image data involved, such as zero-mean counterparts of the iterated image and the watermark image. Again, zero-mean counterparts can be obtained by subtracting from each pixel value of each image the average of all pixel values of that image.

In each of the above-described arrangements, a filtering function can optionally be applied to one or both of the iterated image and the content (watermark) image before the similarity metric is computed. A suitable filtering function is a high pass filter. Another suitable filtering function is an oct-axis or criss-cross filter.

Oct-axis and criss-cross filters are detailed in applicant's U.S. patent documents U.S. Pat. Nos. 6,483,927, 6,580,809, 6,724,914, 7,231,061, 10,664,722, 20100165158, 20100325117, 20140029809, 20150055837, 20160189381, 20170004597, 20180005343, 20180182116, 20190266749 and 20190332840. As typically implemented, these filters produce, for each pixel value, an output value that is based on signs of the value differences between that pixel and each of four or eight closest neighbors. This sign( ) operator is not differentiable, and so is not suitable for normal gradient optimization methods. Instead, a differentiable operator, such as tanh( ) is substituted in the oct-axis or criss-cross filtering method to express relationships of the subject pixel value to neighboring pixel values. The filtered pixel value is then the sum of four or eight tanh( ) terms. That is, in one particular implementation, the oct-axis filtered value for a subject pixel is:

$$F(p) = \sum_{i=1}^{8} \tanh\ (p - p_i)$$

where $\underline{p}$ is the value of the subject pixel, and $\underline{p_i}$ is the value of a neighboring pixel.

So in an exemplary implementation of such an arrangement, the content loss function can be expressed as:

$$L_{content} = F(\text{iterated}) \cdot F(\text{watermark})$$

where F(iterated) and F(watermark) are filtered versions of the iterated and watermark images, respectively.

Again, such filtering arrangement can likewise be employed when the content loss function has two terms—one based on iterated image similarity to the payload watermark component, and one based on iterated image similarity to the reference signal watermark component.

In one particular application, such style transfer methods are used to generate watermarked counterparts to texture patterns of the sort that are molded onto plastic industrial and consumer products, such as the leather grain-like surface finish that is commonly molded into automobile dashboards. (Previous work in this area is detailed in U.S. patent publication 20220388213.) In one implementation, the modified Gatys method discussed above and illustrated in FIG. 2 is employed. Code for such implementation can draw from code authored by Katherine Crowson at the Github repository crowsonkb/style-transfer-pytorch (which is also archived in the Wayback Machine, www<dot>web<dot>archive<dot>com).

In this application, the iteration process is not seeded with a white noise image, but rather employs the style image (i.e., the leather texture image) as the seed image. That is, the three inputs of Gatys are served by two images—the texture style image (used twice) and the watermark image. Initially, then, there is no style loss—the iterated image initially perfectly matches the style image. By so doing, the final output image is iterated away from the original style (leather) image only so much as is necessary for the watermark signal to gain a prescribed degree of expression, such as may be indicated by the content loss metric achieving a threshold value.

The watermark image that serves as the content image is typically a block of imagery that is repetitively-tiled edge-to-edge to span a larger area. The texture image, itself, may be a block that is also to be repetitively-tiled. It can be advantageous to introduce a further term in the loss function that expresses the seamlessness (or oppositely, the discontinuity) that occurs when the iterated image is repetitively-tiled. That is, such loss function expresses the seamlessness when the right edge of a block is placed to adjoin the left edge of the block, and when the top edge is placed to adjoin the bottom edge.

This seamlessness loss term can be (1) the sum of pixel value differences between pixels at the left edge of each row in the iterated image, and corresponding pixels at the right edge, plus (2) the sum of pixel value differences between pixels at the top edge of each column in the iterated image, and corresponding pixels at the bottom edge.

Alternatively, instead of being sums of differences (i.e., an L1 norm), the seamlessness loss term can comprise sums of squared-differences (i.e., an L2 norm). That is, the term can be the difference between pixel values at opposite ends of each row and column, raised to the second power, and these values then summed together.

The seamlessness term of the composite loss function can further be a weighted combination of both the just-noted L1 and L2 terms.

This seamlessness loss term can, alternatively, not be based exclusively on differences between the outer-most values of the iterated image, and their tiled neighbors, but instead be based, at least in part, on differences between the average of pixel values at outer edges of each row and column, such as the two or five edge pixels at the outer edges of each row/column.

Still another variant employs a seamlessness metric based not on all of the pixels along the outer boundary of the iterated image, but just a sampling. An example is pixels at opposite ends of 5, 10 or 20% of the image rows, and at opposite ends of 5, 10 or 20% of the image columns. These pixels may be at scattered positions along the edge, or in continuous strips.

Yet another variant seamlessness metric employs a term that tends to force the outer-most edge pixels of the stylized output image to have values matching corresponding edge pixels of the corresponding watermark image. The watermark image, itself, has opposite edges that match seamlessly. Such a loss function can be the sum of differences between corresponding pairs of edge pixels (i.e., in the stylized output image and the watermark image). Or the sum of squared distances. Or a combination of both. Instead of such L1 or L2 norms, another such function computes a 1D correlation between the pattern of values along the four edges of the stylized output image and the four edges of the watermark image. Again, a combination of such terms can be used.

In all such embodiments, pixel values of the iterated image can be adjusted in accordance with a gradient optimization process that employs a three-term composite loss function, employing weighted style, content, and seamlessness loss functions, e.g.:

$$L_{Total} = \alpha L_{Style} + \beta L_{Content} + \gamma L_{Seam}$$

where $\alpha$, $\beta$ and $\gamma$ are respective weighting factors for the style loss term, the content loss term, and the seamlessness loss term.

Seams (image-tiling boundaries) can additionally, or alternatively, be addressed by applying the style transfer process on an already-tiled array of, e.g., 3×3 watermark image blocks, and then excerpting the center block after stylization of the tiled array.

Additional terms can also be included in the composite loss function. One is a variational loss metric, to reduce large value differences between adjoining pixels. Such a metric can be computed by summing all of the absolute pixel differences along one or more row-based scans through the output image, combined with the sum of all the absolute pixel differences along one or more column-based scans through the output image. A variant is related, but sums squares of such differences.

Another term that can be included in the composite loss function is a colorization metric. The Crowson GitHub code was written to enable stylization of color images. We commonly use a greyscale content image (the watermark pattern) and a greyscale style image (the texture pattern). However, there is no constraint in the Crowson code to prevent the stylized image from iterating away from greyscale. To reduce the introduction of color into the iterated image, we can introduce a loss term that sums, across all pixels in the output image, the absolute difference between the red and green values at a pixel, and the absolute difference between the red and blue values at the pixel. A variety of other such metrics can be devised to express the degree of colorization (e.g., summing, for each pixel in the output image, the difference between the maximum of the red, blue and green pixel data, and the minimum of the red, blue and green pixel data, etc.).

The Crowson GitHub code can stylize an input image repeatedly, at progressively-larger scales, each greater than the previous by a factor of sqrt(2). This capability is used when stylizing large content images, using large style images, to avoid undesirable artifacts that can occur by starting out with large images. (In the latter case, the small convolution kernels used in the VGG-16 network will respond only to very fine scale features, interfering with the desired stylization effects.)

An illustrative stylization process that employs progressively-larger scales is detailed below.

A high resolution texture tile, of the sort that is normally used to define laser etching of an injection mold for a plastic item, is to be used as the style image. It may be 4800×4800 pixels in size, and define a leather-like pattern that is to be rendered on a 4×4 inch patch of mold surface, and tiled with other such patches to mold, e.g., the dashboard of an automobile. A block of watermark pattern, which will ultimately be rendered at 150 "waxels" per inch, is to be used as the content image, and scaled to a size of 1084×1084 pixels. The scaled watermark pattern is tiled to create an N×M array of blocks no larger than the texture file. In this case, a 4×4 array of watermark blocks is formed, having a total size of 4336×4336. The texture file is cropped to this same size.

A 4K by 4K image is too large to conveniently stylize; the Nvidia RTX3090 GPU used in an exemplary implementation doesn't have sufficient memory. Accordingly, the cropped texture image, and the arrayed watermark tiles, are each divided into fourths, of size 2168×2168 pixels (termed "2K" for shorthand). Each is processed separately, e.g., beginning with a 2K excerpt in the upper left of the larger image.

The code starts by down-sampling the input style image (the 2K excerpt from the upper left of the texture image) down to size 128×128 pixels. It does likewise with the input content image (the 2K excerpt from the upper left of the tiled watermark image). These two 128×128 pixel images are applied to the FIG. 2 arrangement as the style, content and seed images (with the down-sampled excerpt of the leather pattern image serving as both the style image and the seed image).

As discussed before, the style image is applied to the VGG-16 network, and Gram matrix data is produced from the resultant layer activations. This Gram data is stored as reference data. The seed image is applied to the network and, being the same as the style image, the same Gram data is produced, indicating nil style loss. The 128×128 seed image is then compared to the 128×128 content (watermark) image for similarity, and a corresponding content loss is computed (e.g., by a dot product operator). Gradient descent is then applied based on the composite loss function (which may include additional terms, such as seamlessness loss and colorization loss) to determine pixel adjustments to the seed image.

The process repeats—this time with the adjusted (iterated) image applied to the network. Gram matrix data is produced, and a corresponding style loss function is produced by comparison of this Gram data with the earlier-stored reference Gram data. Content loss data is produced by determining similarity of the iterated image with the content (watermark) image. Gradient descent is then applied based on the composite loss function to determine further pixel adjustments to the iterated image.

The process continues in this fashion for 500 cycles, each time adjusting pixels of the iterated 128×128 pixel image in a quest to optimize the composite loss function. The result of this 128×128 phase of operation is a stylized 128×128 pixel iterated image corresponding to the upper left quadrant of the 4336×4336 cropped texture file. This iterated image expresses a balance between the content and style images, and other factors, as controlled by weighting factors of the different components of the composite loss function.

After the just-detailed 128×128 phase of operation, the process continues (again based on this upper left quadrant) for imagery enlarged by a factor of the square root of two, i.e., of size 181×181 pixels. In particular, the 2K upper-left quadrant of the leather texture (style) imagery is down-sampled to size 181×181, and likewise the 2K upper-left quadrant of the watermark image is down-sampled to size 181×181. The former is applied to the network as the style image, and reference Gram matrix data is extracted and stored for use in this 181×181 phase of operation.

In this 181×181 phase of operation, the style image is not also used as the seed image. Rather, the seed image is the iterated 128×128 pixel image resulting from the first phase of operation, up-sampled to a pixel resolution of 181×181. This seed image is applied to the network, and Gram matrix data is derived. A style loss term of the composite loss is computed based on the squared error between this Gram data and the stored reference Gram data for the 181×181 pixel phase. The content loss term of the composite loss is computed based on the similarity between the seed image and the 181×181 pixel content (watermark) image. Gradient descent is then applied based on the composite loss function to determine pixel adjustments to the seed image.

The adjusted (iterated) image is applied to the network for a second pass, and a style loss term is computed based on the network layer responses. A content loss term is based on similarity with the content (watermark) image. Gradient descent is again applied, and further pixel adjustments are made to the once-iterated image.

Again, 500 such cycles are performed, yielding a 181×181 pixel image that has attributes of both the 181×181 pixel style (leather) and content (watermark) images.

The process continues in this fashion, with the next phase conducted at a pixel resolution of 256×256. The style and content images are produced by down-sampling the full-resolution quadrant of texture pattern and watermark pattern down to this scale. Again, the style image is applied to the network to establish reference Gram data. The last iteration of the 181×181 pixel image resulting from the prior phase is up-sampled to 256×256 pixels to serve as the new seed image, and 500 adjustment cycles follow, eventually yielding a 256×256 pixel iterated image having attributes of the upper left quadrants of both the leather texture and the watermark pattern.

This iterated image is up-sampled to 360×360 pixels to serve as a seed for a fourth phase of operation, yielding a 360×360 pixel iterated image. In a fifth phase of operation a next-larger, 512×512 pixel iterated image is produced, followed by a 724×724 pixel iterated image resulting from a sixth phase of operation, and a 1024×1024 pixel iterated image resulting from a seventh phase of operation, and a 1448×1448 pixel iterated image resulting from an eighth phase of operation, and a 2048×2048 pixel iterated image resulting from a ninth phase of operation. In a tenth phase of operation, the imagery is scaled up by the remaining factor needed to achieve the ending 2168×2168 pixel size of the upper left quadrant of the cropped leather texture file, i.e., a factor of 1.059. At the conclusion of these ten phases of operation (each comprising 500 cycles of iteratively-adjusting pixel values), the iterated image is a stylized counterpart to the upper left quadrant of the leather texture image.

Attention then turns to the next quadrant, e.g., the upper right quadrant. The full resolution 2168×2168 pixel leather texture and watermark images are down-sampled to 128×128, and the just-detailed ten phase process repeats.

Similarly for the remaining two quadrants.

After all 2168×2168 excerpts of the leather texture image have been stylized, they are assembled into a 4336×4336 stylized final image. Desirably, this final image is checked to confirm that the watermark payload is readable.

In some embodiments, the strength of the watermark reference signal and payload signal are assessed using corresponding strength metrics (e.g., as detailed in U.S. Pat. Nos. 7,286,685 and 10,506,128) and checked to assure that such strengths meet or exceed desired values. After the image has been tested to confirm its watermark readability, the image can be sent to a laser engraver to shape the surface levels of an aluminum, steel, or other plate or other mold surface (or shape the surface of a consumer product, such as the metal back of a smartphone) in accordance with the image values.

Boundary discontinuities can be addressed throughout the above-detailed scaling-up stylization process. In initial experiments, when the large 2168×2168 pixel quadrants were stitched together, discontinuities appeared along the boundaries. This is addressed by, each time the image is scaled up to a new size, taking the outer boundary (e.g., 1 pixel in width) around the newly scaled image and saving it. A difference between this saved boundary and the outer boundary of the stylized image is computed for each iteration, and used as another loss term in the total loss function. The outer boundary width (e.g., 1, 2 or more pixels) and the weighting given to this loss term, are adjusted for most pleasing results. This arrangement allows the network to slightly change the outer boundary of each sub-image region because we know they would stitch back together seamlessly originally, and if changed only slightly from such values, a similar result should be obtained.

This is akin, conceptually, to the above-described seamlessness loss term that compares the edges of the overall image with its opposite counterpart, except that in that case we allow the edges to change together, whereas in this case we are trying to limit changes as much as possible.

In an illustrative embodiment, the content (watermark) image has a mean pixel value of 128.1, and the style (leather) image has a mean pixel value of 87.9. The resultant stylized output image has a mean value of 88.5. This is strikingly different than the prior art, in which the stylized output signal has a mean pixel value that is very close to the mean pixel value of the content, watermark, signal. (As noted, the watermark signal commonly has a mean luminance value of about 127 or 128 in an 8-bit representation. The L2 term used for the content loss term in the prior art, in conjunction with typical weighting parameters used in the composite loss function, forces the mean luminance value of the stylized image to be within a few digital numbers of this value, e.g., within 1, 3, or rarely up to 10 digital numbers away from a mid-grey of 127.5.)

Thus, a stylized output image conveying a digital watermark signal, in accordance with an embodiment of the present technology, may commonly have a mean luma value (in an 8-bit representation) of less than 117 or more than 138, and may have a mean luma value of less than 124 or more than 131. That is, such image need not necessarily have mean luma values between 124 and 131 (or 117 and 139).

Such a watermarked output image is further characterized by not being simply composed as a weighted combination of a watermark image and a style (host) image. Something more is present. Put mathematically, there is no scaled version of the style image that can be subtracted from such an output image and leave just a scaled version of a watermark image as the residue. In particular, the residue in such cases will always have a component (the "something more") in addition to the usual payload signal and reference signal of which the watermark image is composed. Similarly, there is no scaled version of a watermark image than can be subtracted from such a stylized output image and leave simply a scaled version of the style (host) image as the residue. Something more will again be present.

Commonly, embedding a digital watermark in a host image is a steganographic operation. That is, a human observer cannot discern that the host image has been changed. Or, if the watermark strength is set to an exceptionally high level, the embedded image will appear grainy—as if high frequency noise has been added across the host image. Yet the structural elements of the host image appear unchanged. Edges appear to be in the same locations, and no new features (apart from the high frequency noise) appear.

In contrast, human observers can commonly discern structural changes in watermarked, stylized images produced according to the present methods.

Figures 3A, 3B, 3C, 4A, 4B:
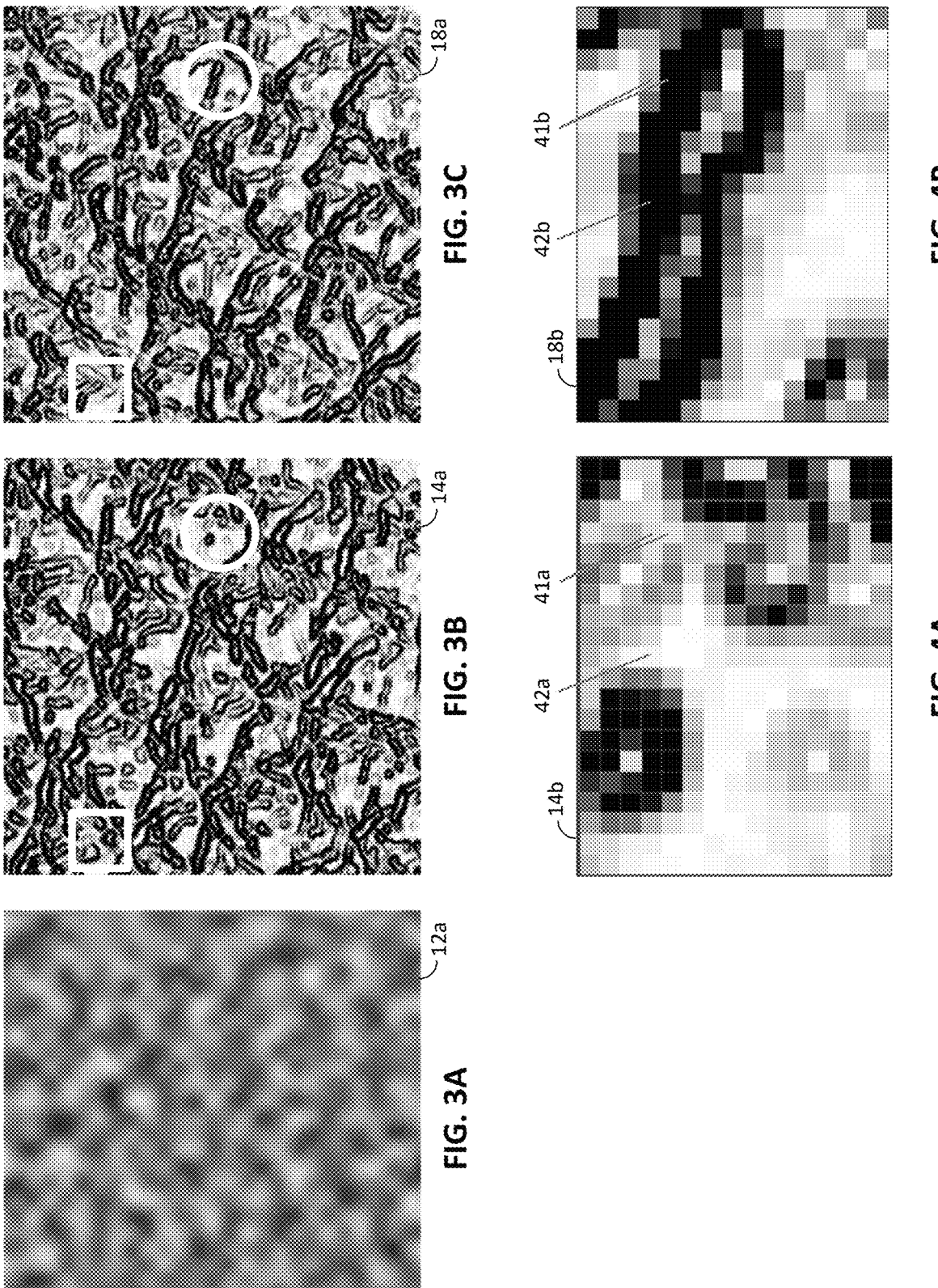
FIGS. 3A, 3B and 3C respectively show enlarged excerpts of a watermark image, a style image, and an output image depicted in FIG. 1.
FIGS. 4A and 4B are further enlarged excerpts taken from the white-circled areas in FIGS. 3B and 3C, respectively.

FIGS. 3A, 3B and 3C show enlarged central excerpts, 12a, 14a and 18a, of the content (watermark) image 12, style (leather) image 14, and final output image 18 shown in FIG. 1. FIG. 3B shows the input leather image, and FIG. 3C shows the stylized output image. Comparing the areas within the white circles toward the right sides of FIGS. 3B and 3C it be seen that the FIG. 3C stylized output image is structurally different than the FIG. 3B style image; edges (gradients) have been added.

In other respects, edges have been removed. Comparing the areas within the white squares toward the left sides of FIGS. 3B and 3C it can be seen that the FIG. 3C stylized image is structurally different than the FIG. 3B style image.

Once alert to this attribute, the reader will be able to look back at images 14 and 18 in FIG. 1 and discern structural differences-edges introduced by (and removed by) the neural network.

By both the introduction and removal of edges, and feature defined thereby (such as the closed shapes within the white circle in FIG. 3C), the neural network has employed aspects of the leather style image 14/14a that give it its distinctive look, to collectively and approximately mimic lighter and darker regions of the watermark signal within the output image 18/18a.

As noted, a common hallmark of such arrangement is the introduction of new edges into the output image. Referring to FIG. 3A, the watermark image lacks edges of the magnitude that have been introduced into the output image. (For purposes of the present disclosure, the magnitude of an edge is the maximum difference in 8-bit luma values between pairs of side- or corner-adjoining pixels crossing the edge.) The strongest edge in the depicted watermark signal has a magnitude of 20 (e.g., adjoining pixels having values of 114 and 134). So if this watermark signal were summed at full-strength with a host image (an unlikely procedure), an edge in the host image might change in magnitude by 20.

However, it will be seen that edges in the stylized image have been changed by much larger amounts, as compared with the host (style) image.

FIGS. 4A and 4B are further magnified excerpts taken from within the white circles of FIGS. 3B and 3C, respectively. In FIG. 4A, reference numeral 41a identifies a pair of pixels in the style (leather) image having 8-bit greyscale values of 213 and 219, or a gradient of magnitude 6. In contrast, reference numeral 41b in FIG. 4B shows the same pair of pixels in the stylized output image, where they have values of 173 and 0, for a gradient of 173. This change in edge (gradient) strength, from 6 to 173, far surpasses the strongest gradient change that could result by simply summing the style image with a scaled-down version of the watermark signal, as might be done in conventional watermark embedding.

Moreover, this change in edge strength does not come from spatially-shifting an existing edge within the style image to a new location, or modulating the width of a line, both of which are taught in our U.S. Pat. No. 6,449,377. Instead, the detailed style transfer embodiments commonly create new edges. The boundary between the pair of pixels 41a in the input style image FIG. 4A does not form an edge, whereas the boundary between the pair of pixels 41b in the output image FIG. 4B does. (An edge may be defined as an interpixel gradient exceeding a threshold magnitude. A threshold of 30 is exemplary for use with 8-bit greyscale images, although larger values, such as 50, 80 or 120, can alternatively be used.)

Thus, one aspect of a watermarked output image according to the present technology is that it includes interpixel gradients that are stronger, by at least 30 (or 50, or 80, or 120), than corresponding interpixel gradients in the input (e.g., host or style) image from which it is derived. (Again, this is in the context of 8-bit imagery. If, e.g., 16 bit pixel values are used, ranging from 0-65535, then this 30 value can be adjusted proportionately, translating to 30*256=7680.)

A simpler hallmark of watermarked images according to the present technology is that certain pixel values are changed by more than 64 in an 8-bit system, when compared with the original style image. Consider pixel 42a in the excerpt of the style (leather) image shown in FIG. 4A. It has a value of 239. The counterpart pixel 42b in the excerpt of the stylized output image shown in FIG. 4B has a value of 0. The pixel value has thus changed by 239. Again, this is not due to spatially-shifting an existing edge or feature within the style image to a new location, or changing the width of a line. In other implementations, certain pixel values are changed by more than 128 or by more than 192. (Again, the values stated for an 8-bit system can be adjusted proportionately for use in other systems. For example, in 12-bit image systems, which can represent pixel values of 0-4095, the 128 value translates to 16*128, or 2048.)

CONCLUDING REMARKS

Having described and illustrated principles of the technology with reference to specific implementations, it will be recognized that the technology can be implemented in many other, different, forms.

For example, while detailed in the context of greyscale imagery, principles of the present technology likewise can be applied to color imagery. In some embodiments, the watermarking signal is manifested in the chrominance (chroma) domain, rather than in the luminance (luma) domain, as detailed in patents cited below. Such chrominance implementation can be straightforwardly understood based on the foregoing discussion of a luminance implementation.

Naturally, the image pixel values can be represented in any desired signal space. RGB is most familiar, but others, such as L*a*b*, are sometimes desirable, since the luminance component can be specified independently of the color components.

While the above arrangements can seed the stylization process by using a noise image, the style image, the content (e.g., watermark) image, or a different image, can alternatively be used.

Although Gatys' style loss component is based on a mean-squared distance between Gram matrices (i.e., an L2 norm), in other embodiments an L1 norm between Gram matrices can be used instead. Alternatively, a combined loss component can be used, including terms of two or more different norms combined, e.g., in a weighted ratio.

Similarly, a combined loss component can be used for the content loss. One of many such examples is a weighted combination of a correlation metric and an L1 term, both computed between a content (watermark) image and an iterated (stylized output) image.

(As indicated earlier, zero-mean images can be used in computing such loss terms.)

While Gram matrix-based style representations are used in the detailed arrangement, they are not required. In other implementations, different style representations can be employed-some based on layer activations (filter responses) within a neural network like VGG-16, some not. Among the former types of style representations are:

Correlation Matrix: The correlation matrix measures the correlation between the filter responses in the convolutional neural network. Unlike the Gram matrix, which only measures the magnitude of the responses, the correlation matrix captures information about the direction of the responses.

Maximum Activation: The maximum activation style representation takes the maximum activation of each filter in a given layer. This approach emphasizes the most distinctive features of a style image.

Histogram: The histogram representation measures the frequency of different filter responses in a given layer. This representation can be used to capture the texture of a style image.

Among the latter types of style representations are:

Histogram of Oriented Gradients (HOG): HOG is a feature descriptor that computes the distribution of oriented gradients in an image. It can be used as a style representation, and a corresponding style loss term can be computed, e.g., as an L1 or L2 distance between HOG features of the style image and HOG features of the iterated (stylized) image.

Wavelet Transform: Wavelet transform can be used as a style representation by decomposing the style image into different frequency sub-bands, and computing a corresponding style loss term therefrom, e.g., as an L1 or L2 distance between a histogram of frequency sub-bands of the style image and such a histogram for the iterated (stylized) image.

Local Binary Patterns (LBP): LBP is a texture descriptor that encodes the local structure of an image. It can be used as a style representation by computing the LBP features of the style image. A corresponding style loss term can be computed, e.g., as an L1 or L2 distance between the set of LBP features of the style image, and a corresponding set of LBP features for the iterated (stylized) image.

Markov Random Fields: This method models the statistical relationships between neighboring pixels and represents style as the distribution of pixel values in the image. Again, such data can be generated from the style image, and counterpart data can be generated from the iterated (stylized) image, with a distance between the two serving as a style loss metric.

Higher-Order Statistics: Higher-order statistics, such as skewness and kurtosis, can be used to capture more complex statistical properties of the style image. Again, such statistics can be determined from the style image, and compared against corresponding statistics determined from the iterated (stylized) image to serve as a style loss metric.

Various different metrics can also serve to indicate the similarity between the watermark (content) image and the iterated image, other than the arrangements detailed above (e.g., correlation operations). One example is the structural similarity index (SSIM). This metric quantifies the similarity between two images based on their structural information, including luminance, contrast, and structural similarity. Another example is histogram intersection, which indicates similarity between two images based on similarity of their histograms. Still another example is the so-called Earth mover's distance, which measures a cost function of work required to transform one image into the other.

Figure 5:
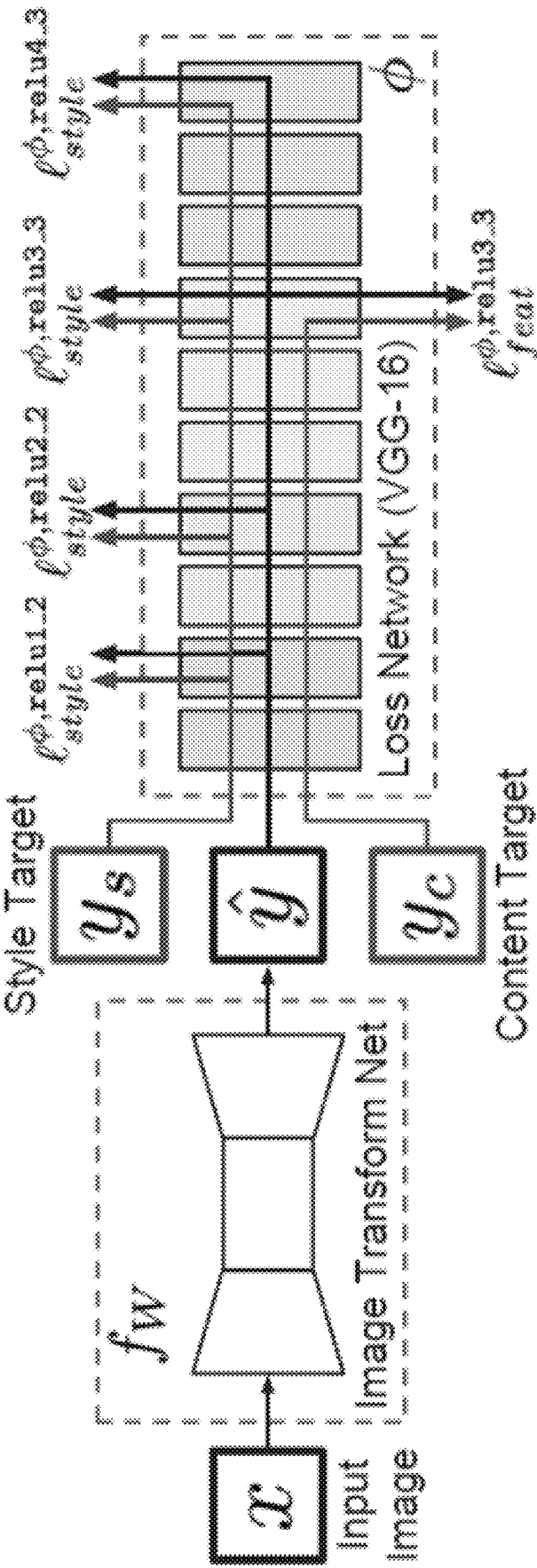
FIG. 5 is an illustration of a feed-forward style transfer arrangement employing an image transformation and a loss network, as published in the cited Johnson paper.

While described in the context of the Gatys work, the principles detailed herein (e.g., avoiding an L2 term for the content loss, and/or deriving the content loss by comparison with the watermark image rather than from layer activations corresponding to the watermark image) are applicable in other style transfer networks, such as feed-forward networks as detailed in Johnson, etc. In the case of feed-forward networks, it will be understood that the iterative process is not applied to an input image to yield a stylized output image, but rather is applied to learn network coefficients for an image transformation network that can, after such training, stylize an input image in a single-pass through the network, without any iteration. Such learning of image transformation network parameters can employ the loss functions detailed herein. In one particular example, the feature reconstruction (content) loss is not derived using layer activations from a loss network (as shown in the Johnson figure reproduced as FIG. 5 of the present application), but rather by similarity between the content image and an output from the image transformation network.

The Gatys papers and the Johnson paper are attached as appendices to priority application 63/333,117, together with a paper by Simonyan that details the VGG-16 network used in Gatys. These documents, and the rest of the priority applications, are incorporated herein and form part of this specification.

While the illustrative embodiments use watermark resolutions of 150 waxels per inch (WPI), this is not required. Different resolutions, including odd and non-integral, can be used as appropriate. In some situations, for instance, it may be advantageous to encode the watermark at a resolution of 155.2 WPI. This can enable fitting an integer number of 128×128 waxel watermark tiles into a seamlessly repetitive square patch of texture (e.g., leather). This, in turn, can permit the watermarked texture patch to be tiled with other such patches without introducing discontinuities (e.g., manifested as spurious signals in the frequency domain of the watermark's reference signal), as might otherwise by caused by presence of a fractional watermark pattern along one edge of the texture patch.

Relatedly, the resolution of the watermark may be chosen in accordance with the scale of features and frequencies in the texture (style) pattern. If the texture is finely detailed, a higher resolution watermark (e.g., 200 WPI or higher) can be desirable, since any visible changes will be of a scale and frequency similar to that of the original texture. If the texture comprises larger features, a lower resolution watermark (e.g., 100 WPI or lower) can be desirable for the same reason. (However, this latter choice may be counter-indicated by the fact that low resolution watermarks require larger areas to read, and may not be as robust to local geometric distortions.)

It will be recognized that the detailed arrangements can generate new textures, incorporating style aspects of existing textures. By using the seamlessness loss functions discussed above, the generated textures can be made repetitive (with opposite edges tending to match), even if the original textures did not have this attribute. This can be useful to texture designers irrespective of any use of watermarks.

For instance, consider a texture designer who wishes to create a leather-like pattern that is repetitive. Natural leather (i.e., from an animal) is not repetitive. Using an image of natural leather as a style image, e.g., depicting a patch that is four inches on a side, the texture designer can create a new texture image of the same size, but which is repetitive-permitting its tiling to cover an area of arbitrary size. The content image in such example can be a watermark image (e.g., pattern 12 of FIG. 1), in which case the resulting stylized image can be made repetitive and watermarked. Or the content image can be any other image having low contrast and devoid of conspicuous features (i.e., akin to pattern 12, but not conveying a watermark), in which case the resulting stylized image can still be made repetitive but not convey a watermark.

(If the content image is a watermark image, it is typically repetitive, which helps reduce edge discontinuity between blocks of the stylized image. But edge discontinuity can be reduced regardless of the repetitiveness of the content image. Not by style information expressed using gram matrices estimated from the overall image, because seam discontinuities are not reflected in such information. But instead a mask can be defined for the seam area, potentially smoothly covering the seam and tapering down with distance away from the seam. Pixels under this mask can be updated with varying intensities in accordance with the mask, to minimize a scam discontinuity loss function in one of the manners detailed earlier.)

Moreover, new textures can be created based on existing style textures without use of a content image. Reference Gram matrices corresponding to an existing style texture are produced by applying the existing style texture to the neural network to determine feature maps that result at plural network layers, and then computing the matrices from the feature maps (e.g., following the Gatys teachings). The process is then repeated, this time applying a noise or other starting image to the network. The resulting Gram data is then compared to the Reference Gram data. The difference is expressed as a loss function that drives a gradient descent process used to adjust pixel values the input (noise) image so as to reduce this loss. This process repeats with the adjusted input image so as to gradually refine the input image into a new texture that has similar statistical properties as the starting, existing texture. The new texture can be made repetitive using the techniques described earlier.

Although not essential, applicant commonly uses a stochastic gradient descent method for iteration, e.g., following the adaptive moment estimation (ADAM) method. See, e.g., Kingma, et al, Adam: A method for stochastic optimization. arXiv preprint arXiv: 1412.6980 Dec. 22, 2014.

The detailed embodiments employ a pure watermark image (signal) as the content image. That is, the image is formed just from the watermark payload and reference signal components. In other embodiments, the content image can be an arbitrary image in which a watermark signal has been embedded (added).

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In an exemplary embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding 1024 bits (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

U.S. patent documents teaching watermark encoding and decoding arrangements include U.S. Pat. Nos. 6,590,996, 7,483,547, 9,245,308, 9,959,587, 10,217,182, 10,242,434, 10,506,128, 11,410,263, 11,568,165, 20180005343 and 20190332840.

A watermarked image according to embodiments of the present technology can be rendered on retail product packaging or container, e.g., by printing on the label, or by texturing on the item surface. The plural-symbol payload conveyed by the watermarked image can be operative, when sensed by a compliant reader component of a system, to control an operation of the system. For instance, when sensed by a compliant reader component of a retail checkout system, the payload can control the system to add a price of the product to a shopper's checkout tally. Or after the product has been used and its empty packaging or container is in a waste stream, the watermark can be sensed by a compliant reader component of a optical sorting system, and can serve to control ejection of such refuse into a collection bin.

The use of watermarks in connection with retail checkouts is detailed, e.g., in U.S. Pat. No. 9,600,982. The use of watermarks in connection with sorting waste is detailed, e.g., in U.S. patent publications 20210299706, 20220055071 and 20220331841. The 3D shaping of container surfaces (texturing) in accordance with watermarked imagery is detailed in U.S. patent publications 20210387399, 20220388213 and 20230096859.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom and i9 series, the ARM A8 and Cortex series, the Qualcomm Snapdragon, and the nVidia Tegra 4). Implementation can also employ a variety of specialized processors, such as graphics processing units (GPUs, such as are included in the nvidia Tegra series, and the Adreno 530-part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits-including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C. C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems-special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

The just-detailed hardware comprises physical structure that is configured, by programming or by arrangement of its gates, etc., to perform the methods and compute the parameters detailed in this specification. The term "content loss means" refers to such physical structure configured to determine one of the similarity metrics detailed earlier in this specification, i.e., between the content image including a digital watermark pattern (or a filtered version of the content image) and the iteratively-processed image (or, in the case of a feed-forward network, an output from the image transformation network). The term "style loss means" refers to such physical structure configured to determine a style loss term, as detailed above and in the Gatys and Johnson papers.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A watermarked image embedded in a physical surface or stored on a non-transitory computer readable medium, previously derived from an original image, the watermarked image having a mean value that is not between 124 and 131, wherein at least one of the following conditions is satisfied:

(a) a gradient between a pair of adjoining pixels in the watermarked image differs, by more than 30, from a gradient between a spatially-corresponding pair of pixels in the original image; or (b) a pixel value in the watermarked image differs, by more than 64, from a pixel value in the original image;

wherein the watermarked image is structurally different than the original image, with edges having been both added to and removed from the original image.

2. The watermarked image of claim 1 in which condition (a) is satisfied, and in which a gradient between a pair of adjoining pixels in the watermarked image differs, by more than 50, 80 or 120 from a gradient between a spatially-corresponding pair of pixels in the original image.

3. The watermarked image of claim 1 in which condition (b) is satisfied, and in which a pixel value in the watermarked image differs, by more than 128 or 192, from a pixel value in the original image.

4. The watermarked image of claim 1 in which both conditions (a) and (b) are satisfied.

5. The watermarked image of claim 1 having a mean value that is not between 117 and 139.

6. The watermarked image of claim 1 in which the watermarked image encodes a plural-symbol payload, said payload being operative, when sensed by a compliant reader component of a system, to control an operation of said system.

7. The watermarked image of claim 1 in which said numeric parameters are stated in context of an 8-bit representation, but can be adjusted proportionately for use in other bit representations.

8. The watermarked image of claim 1 in which satisfaction of said condition(s) is not due to shifting of an edge in the original image, or modulation of a line width in the original image.

9. The watermarked image of claim 1 in which the watermarked image includes interpixel gradients that are stronger, by at least 50, than corresponding interpixel gradients in the original image.

10. The watermarked image of claim 1 in which the watermarked image is characterized by not being simply composed as a weighted combination of a watermark image and a style image, such that there is no scaled version of the style image that can be subtracted from the watermarked image to leave just a scaled version of a watermark image as residue.

11. Retail product packaging or container that conveys the watermarked image of claim 1, in which the watermarked image encodes a plural-symbol payload, said payload being operative, when sensed by a compliant reader component of: (a) a waste sorting system, to control an ejection operation of said waste sorting system, or (b) a retail checkout system, to add a price of said good to a shopper's checkout tally.

12. A molded item having a surface level that varies in accordance with pixel values of the watermarked image of claim 1.

* * * * *